United States Patent
Kerber et al.

(10) Patent No.: US 11,422,625 B2
(45) Date of Patent: Aug. 23, 2022

(54) PROXY CONTROLLER SUIT WITH OPTIONAL DUAL RANGE KINEMATICS

(71) Applicant: Human Mode, LLC, Oklahoma City, OK (US)

(72) Inventors: William Xavier Kerber, Oklahoma City, OK (US); Jonathan Gilmore, Oklahoma City, OK (US)

(73) Assignee: Human Mode, L.L.C., Oklahoma City, OK (US)

( * ) Notice: Subject to any disclaimer, the term of this patent is extended or adjusted under 35 U.S.C. 154(b) by 0 days.

(21) Appl. No.: 17/139,551

(22) Filed: Dec. 31, 2020

(65) Prior Publication Data

US 2021/0200311 A1 Jul. 1, 2021

Related U.S. Application Data

(60) Provisional application No. 62/955,735, filed on Dec. 31, 2019, provisional application No. 63/022,713, filed on May 11, 2020.

(51) Int. Cl.
*B25J 9/16* (2006.01)
*G06F 3/01* (2006.01)
*G06F 3/0346* (2013.01)

(52) U.S. Cl.
CPC ............ *G06F 3/014* (2013.01); *G06F 3/0346* (2013.01)

(58) Field of Classification Search
None
See application file for complete search history.

(56) References Cited

U.S. PATENT DOCUMENTS

| 9,573,276 B2 | 2/2017 | Stephens |
| 9,643,314 B2 | 5/2017 | Guerin et al. |

(Continued)

FOREIGN PATENT DOCUMENTS

| CN | 107336233 A | 11/2017 |
| EP | 3252714 A1 | 12/2017 |
| RU | 2134193 C1 | 8/1999 |

OTHER PUBLICATIONS

Kim et al. "Deep Full-Body Motion Network for a Soft Wearable Motion Sensing Suit", IEEE/ASME Transactions on Mechatronics, vol. 24, No. 1, Feb. 2019. Retrieved on Apr. 16, 2021. Retrieved from <URL: http://softrobotics.snu.ac.kr/publications/KimDY_IEEE_TMech_2019.pdf>.

(Continued)

*Primary Examiner* — Carl Adams
(74) *Attorney, Agent, or Firm* — Crowe & Dunlevy, P.C.

(57) ABSTRACT

A proxy controller suit for enabling an operator to control an actual or virtual proxy in an actual or virtual remote space includes a central tracking unit that is configured to provide the position of the operator in a tracked space. The proxy controller suit includes a first motion sensor attached to a first location on a first appendage of the operator at a known first distance from the central tracking unit, wherein the movement of the first motion sensor is determined with reference to the first motion sensor. The proxy controller suit also includes a second motion sensor attached to a second location on the first appendage of the operator at a known distance from the first motion sensor, wherein the movement of the second motion sensor is determined as a function of the measurements made by the first motion sensor.

20 Claims, 9 Drawing Sheets

(56) References Cited

U.S. PATENT DOCUMENTS

| | | |
|---|---|---|
| 9,665,174 B2 | 5/2017 | Osman |
| 9,815,191 B2 | 11/2017 | Oleynik |
| 9,975,248 B2 | 5/2018 | Stephens |
| 10,203,762 B2 | 2/2019 | Bradski et al. |
| 10,322,506 B2 | 6/2019 | Ding et al. |
| 10,324,522 B2 | 6/2019 | Balslev et al. |
| 10,429,924 B1 | 10/2019 | Kerber |
| 2009/0325710 A1* | 12/2009 | Filer ................... G06F 3/03 463/37 |
| 2012/0046901 A1 | 2/2012 | Green et al. |
| 2013/0211594 A1 | 8/2013 | Stephens, Jr. |
| 2014/0302462 A1 | 10/2014 | Vatcher et al. |
| 2017/0108929 A1 | 4/2017 | Sinko et al. |
| 2017/0129105 A1* | 5/2017 | Stephens, Jr. ............ B64G 4/00 |
| 2017/0192496 A1 | 7/2017 | Balslev et al. |
| 2018/0081439 A1 | 3/2018 | Daniels |
| 2018/0144480 A1 | 5/2018 | Saboune et al. |
| 2018/0217586 A1* | 8/2018 | Stephens, Jr. ............ A61B 5/24 |
| 2019/0110847 A1 | 4/2019 | Diolaiti et al. |
| 2019/0122436 A1 | 4/2019 | Bashkirov et al. |
| 2019/0155266 A1 | 5/2019 | Gildert et al. |
| 2019/0313915 A1* | 10/2019 | Tzvieli ................... A61B 5/165 |

OTHER PUBLICATIONS

Reiter et al. "On Higher Order Inverse Kinematics Methods in Time-Optimal Trajectory Planning for Kinematically Redundant Manipulators", IEEE Transactions on Industrial Informatics (vol. 14, Issue: 4, Apr. 2018). Retrieved on Apr. 17, 2021. Retrieved from <URL: https://ieeexplore.ieee.org/abstract/document/8253867>.
ISA/US; Search Report and Written Opinion for PCT/US2020/067693; dated May 7, 2021.

* cited by examiner

PROXY CONTROLLER SUIT WITH OPTIONAL DUAL RANGE KINEMATICS

RELATED APPLICATIONS

The present application claims the benefit of U.S. Provisional Patent Application Ser. No. 62/955,735 filed Dec. 31, 2019 entitled, "Proxy Controller Suit," and U.S. Provisional Patent Application Ser. No. 63/022,713 filed May 11, 2020 entitled, "Proxy Controller Suit with Dual Range Kinematics," the disclosures of which are incorporated by reference as if fully set forth herein.

FIELD OF INVENTION

The present invention relates generally to the field of proxy controllers and more particularly, but not by way of limitation, to systems and methods for controlling robot proxies using a controller suit worn by an operator.

BACKGROUND OF INVENTION

Robots have found successful adoption in addressing narrowly-focused problems where the robots are highly specialized to perform specific tasks. The control systems that allow them to do these tasks are typically tailored to those tasks. An example of this narrowly focused application can be seen in the use of robotic systems for automotive manufacturing. These robots perform discrete, repetitive tasks within a static environment.

A goal of robotics designers is to build more human-like robots to provide assistance across a broader range of tasks. Humanoid robots may more easily navigate an open environment with an infrastructure that has been developed for humanoid interaction. Many interfaces and controls have been developed for human interaction, e.g., buttons, doorknobs, etc., and these interfaces are designed for engagement with the unique physical features, proportions and abilities of humans.

Although building a humanoid machine (with limbs and torso etc.) is not an impossible task, building the control systems necessary for them to autonomously operate successfully in an unrestricted environment is very difficult. Nonetheless, most robot designers have taken the approach of attempting full automation where the machine attempts to operate in the world with limited assistance from a human guide. Such autonomy is very difficult to achieve as the robot lacks critical thinking and requires advanced programming and sensors.

As an alternative to developing autonomous robots, a number of designers have worked to develop "robot proxies" that are machines remotely controlled by human operators. In some cases, those designers have contemplated wearable control suits that are intended to track the operator's movements and have the robot proxy mimic those movements. For example, U.S. Pat. No. 9,573,276 describes a system and method of space exploration with human controlled proxy robot surrogates.

A significant problem in remotely controlling robot proxies is ensuring that the operator's movements are accurately tracked and faithfully transmitted to the robot proxy. In conventional controller suits, the sensors may experience "drift" in which the tracking system loses registry with one or more of the sensors worn by the operator and thereafter misinterprets the position of the operator or his appendages. The incorrect data resulting from sensor drift is particularly problematic when the robot proxy is instructed to match the misinterpreted position of the operator's sensors. In light of the deficiencies in the prior art, there remains a need for improved robotic control system. It is to these and other deficiencies in the prior art that the present invention is directed.

SUMMARY OF THE INVENTION

In exemplary embodiments, the present invention includes a proxy controller suit for enabling an operator to control an actual or virtual proxy in an actual or virtual remote space. The proxy controller suit includes a central tracking unit that is configured to provide the position of the operator in a tracked space. The proxy controller suit further includes a first motion sensor attached to a first location on a first appendage of the operator at a known first distance from the central tracking unit, wherein the movement of the first motion sensor is determined with reference to the first motion sensor. The proxy controller suit also includes a second motion sensor attached to a second location on the first appendage of the operator at a known distance from the first motion sensor, wherein the movement of the second motion sensor is determined as a function of the measurements made by the first motion sensor.

In another embodiment, the present invention includes a proxy controller suit for enabling an operator to control an actual or virtual proxy within an actual or virtual remote space, where the proxy controller suit has a central tracking unit configured to provide the position of the operator in a tracked space, and a plurality of sensor clusters that each corresponds to an appendage or portion of the operator's body. Each of the sensor clusters comprises a plurality of motion sensors. The movement of each of the plurality of motion sensors is determined as a function of the measurements of movement made by other motion sensors in the applicable sensor cluster and with reference to the position of the central tracking unit.

In yet another embodiment, the present invention includes a proxy controller suit for enabling an operator to control a robot proxy in a remote space, where the proxy controller suit has a central tracking unit located on the operator's torso that is configured to provide the position of the operator in a tracked space. The proxy controller suit also includes a plurality of sensor clusters that each correspond to an appendage or portion of the operator's body, and wherein each of the sensor clusters has a plurality of motion sensors. The proxy controller suit also includes a suit controller that translates output from the plurality of sensors into command signals delivered to the proxy. The suit controller is configured to shift between a conventional kinematic model and an inverse kinematic model for controlling the remote proxy. The proxy controller suit further includes a proxy controller that is configured to accept the command signals from the suit controller and apply those command signals to the proxy.

WRITTEN DESCRIPTION

Figure 1:
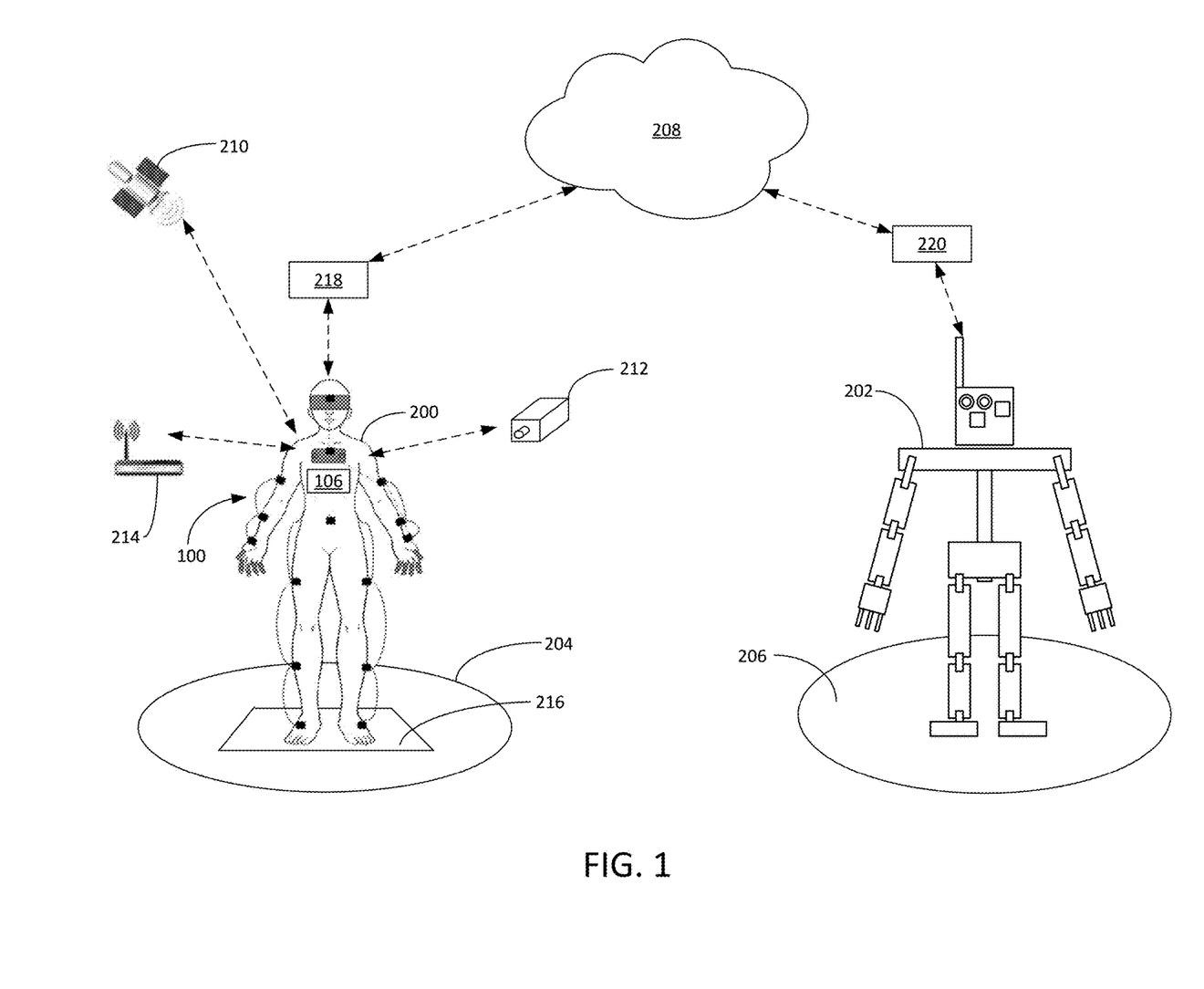
FIG. 1 depicts the control of a robot proxy by an operator using a proxy controller suit.

Beginning with FIG. 1, shown therein is a depiction of human operator 200 controlling a robot proxy 202 with a proxy controller suit 100 worn by the human operator 200. The operator 200 is located in a tracked local space 204 that is spaced apart by a distance from the remote space 206 where the robot proxy 202 is located. The proxy controller suit 100 is a wearable system for enabling the operator 200 to control in real time the movements of an actual or virtual (computer-generated) proxy 202. The proxy controller suit 100 is connected to the robot proxy 202 through a private, dedicated or public network 208. The network 208 may include a combination of wired, wireless, public, and private resources. The distance between the human operator 200 and the robot proxy 202 is only limited by the availability, suitability and span of the network 208. This permits the robot proxy 202 to operate in nearby and distant locations and to operate in environments that are dangerous, challenging or inconvenient for the human operator 200.

The position and movement of the human operator 200 and proxy controller suit 100 within the local space 204 can be determined and updated in real time using resources internal and external to the proxy controller suit 100. For example, the position of the proxy controller suit 100 within the tracked local space 204 can be determined using a global positioning satellite (GPS) system 210, an external camera system 212 or local wireless location systems 214 (including Wi-Fi and Bluetooth), or a combination of these systems. In some embodiments, the local space 204 includes a treadmill 216 or other mobility sensor that permits the operator 200 to walk or otherwise ambulate in various directions while remaining in a substantially fixed location within the local space 204.

The output from the proxy controller suit 100 is presented to a suit controller 218, which interprets the signals generated by the proxy controller suit 100 and passes the interpreted signals to a proxy controller 220 through the network 208. Although the suit controller 218 and proxy controller 220 are depicted as standalone modules, it will be appreciated that in some embodiments, the functionality of the suit controller 218 and proxy controller 220 are incorporated into one or more computers that are connected to the proxy 202 and proxy controller suit 100 through local, direct or distributed computer networks.

Figure 2:
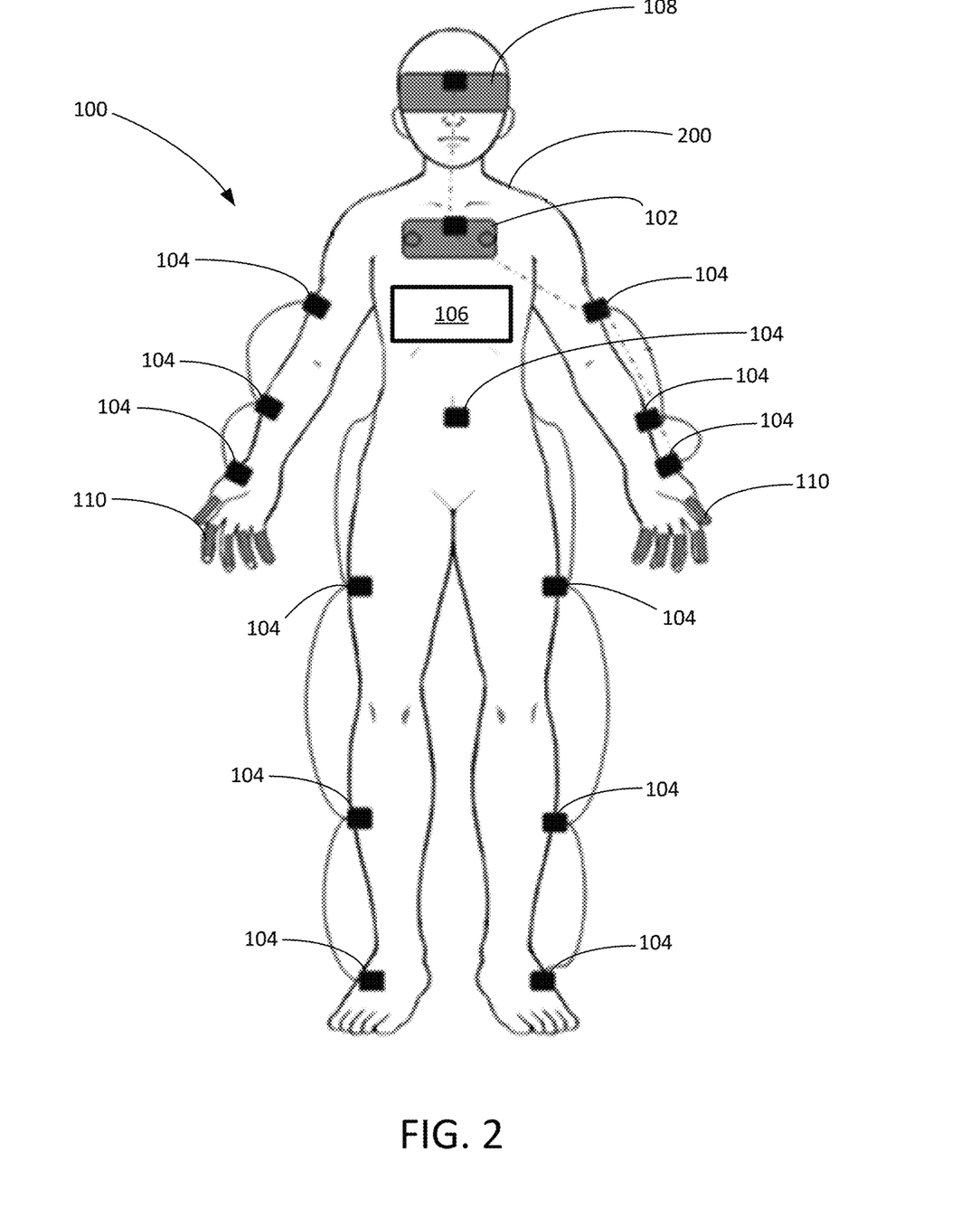
FIG. 2 depicts the operator and proxy controller suit of FIG. 1.

Turning to FIG. 2, shown therein is a close-up view of the proxy controller suit 100 worn by the human operator 100. The proxy controller suit 100 has a central tracking unit 102, a plurality of motion sensors 104, a motion sensor mainboard 106, a visor 108 and one or more peripheral controllers 110. The central tracking unit 102 and motion sensors 104 are attached to the operator 200 at designated parts of the operator's body and are used to accurately track the movements of the operator 200. Unlike prior art proxy control systems, the proxy controller suit 100 utilizes a unique coordination between the central tracking unit 102 that accurately tracks and reports the position of the controller suit 100 within the local space 204, and the various motion sensors 104 that accurately track the movement of the arms, legs, body and head of the operator 200 relative to the position of the central tracking unit 102. This novel arrangement of sensors minimizes sensor drift by identifying the position and movement of the controller suit 100 in space using the central tracking unit 102, and then identifying the position and movement of discrete parts of the controller suit 100 (e.g., arms, gloves, legs or shoes) as a part of a skeletal network of the motion sensors 104 that are each referenced directly or indirectly back to the central tracking unit 102.

As the motion sensors 104 detect movement, the motion sensor movement is tethered back to the central tracking unit 102. The motion sensor mainboard 106 collects the motion data from the motion sensors 104 via a wired or wireless connection or any other sufficient means for sending and collecting data. The visor 108 displays information about the proxy controller suit 100 and the proxy environment and collects information from the user such as auditory commands, motion data, or any other data provided by the user or the user's environment.

Although FIG. 1 depicts a particular arrangement of the central tracking unit 102, visor 108, motion sensors 104 and motion sensor mainboard 106 within the controller suit 100, it will be appreciated that alternative arrangements and configurations of these components within the controller suit 100 are also contemplated as falling within the scope of the exemplary embodiments. In some embodiments, the proxy controller suit 100 may have fewer or additional motion sensors 104 and more than one central tracking unit 102. In some embodiments, the central tracking unit 102 and motion sensor mainboard 106 may be integrated into a single unit, or combined with other elements of the proxy controller suit 100, such as the visor 108 or peripheral controllers 110. It will be appreciated that the various elements of the proxy controller suit 100 are generally connected to one another with wired (as shown) or wireless connections. Data, which may include sensor data, environmental data, controller commands, or any other suitable data, is sent between these components over the wired or wireless connections.

Figure 3:
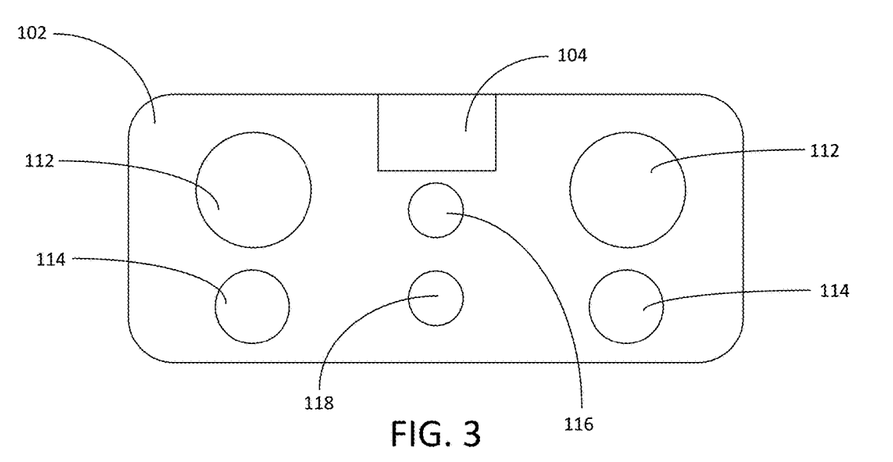
FIG. 3 depicts the central tracking unit of the proxy controller suit.

Turning to FIG. 3, shown therein is a depiction of the central tracking unit 102. In this embodiment, the central tracking unit 102 includes a pair of wide angle (fisheye) cameras 112, stereo image capture lenses 114, an IR projector 116 for illumination in low-light conditions and an RGB sensor 118. The central tracking unit 102 may also include an integrated motion sensor 104. As described above, the central tracking unit 102 is used to determine the gross position of the proxy controller suit 100 in the tracked local space 204.

Figure 4:
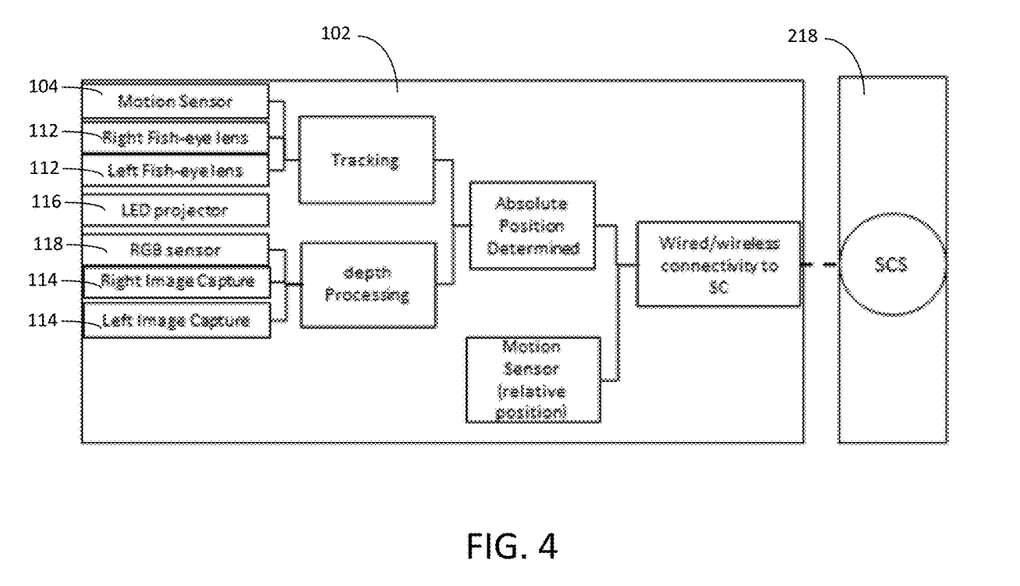
FIG. 4 provides a functional diagram of the central tracking unit and its connection to the suit controller system.

As depicted in the functional diagram in FIG. 4, the central tracking unit 102 determines the position of the proxy controller suit 100 within the local space 204 using "inside-out" technology in which the movement and position of the central tracking unit 102—and hence the proxy controller suit 100—is determined using one or more of the wide angle cameras 112, stereo image capture lenses 114, light (infrared or visible) projector 116, RGB sensor 118 and motion sensor 104. The motion sensor 104 and the left and right wide angle cameras 112 cooperate to track movement of the central tracking unit 102 within the local space 204 by watching changes in the images taken by the cameras 112 and reading the motion detected by the motion sensor 104. The RGB sensor 118 and stereo image capture lenses 114 cooperate to measure the depth of field in front of the central tracking unit 102. This information is processed using within the central tracking unit 102, the mainboard 106 or an external computer to determine the absolute position of the central tracking unit 102 within the local space 204.

In some embodiments, the determination of the position of the central tracking unit 102 is augmented or verified with sensors that are external to the proxy controller suit 100, such as the external camera system 212, a connection with the global positioning satellite (GPS) system 210, and the local wireless location system 214. In yet other embodiments, the central tracking unit 102 relies primarily or entirely on an "outside-in" location system in which external sensors, such as the external camera system 212, are used to detect and follow the position of the central tracking unit 102 within the local space 204. The central tracking unit 102 may be attached to the operator 200 in various different locations, but the central tracking unit 102 is optimally located in a central location such as the head or torso (as depicted) to serve as a tethering point for the distributed motion sensors 104.

Figure 5:
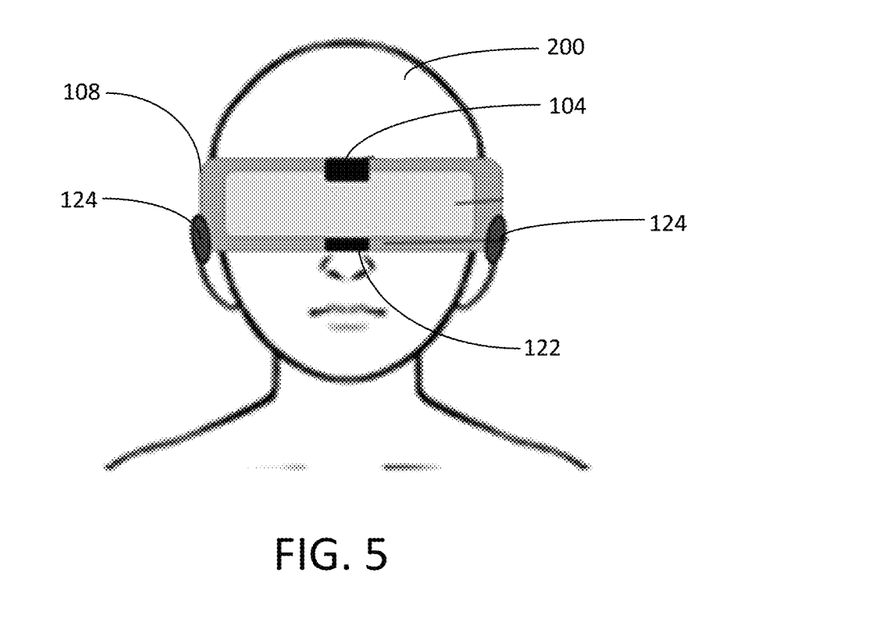
FIG. 5 provides a depiction of the visor of the proxy controller suit.

Turning now to FIG. 5, shown therein is an embodiment of the visor 108. The visor 108 includes a heads-up display (HUD) 120, and an embedded microphone 122, speakers or earpieces 124. The visor 108 may optionally include integrated motion sensor 104. The visor 108 is generally configured to display to the operator 200 the video and audio output from the proxy 202, while overlaying or alternating visual information about the condition of the proxy 202 (e.g., battery strength, signal strength, operating temperature, CPU loads, and current state and posture of the proxy 202), the position of the operator 200 in the local space 204. The visor 108 can also be configured to accept verbal commands from the operator 200 through the microphone 122. Although the visor 108 can be custom built for integration within the proxy controller suit 100, suitable visors are available from Oculus, Microsoft, HTC and other manufacturers.

In some embodiments, the display includes a first person visual representation of the proxy 202, the remote space 206 around the proxy 202, with an overlay of a virtual representation of the position of the peripheral controllers 110 (or other portions of the proxy controller suit 100). In this way, the operator 200 gains a two or three-dimensional depiction of the remote space surrounding the proxy 202 and the visible movements of the proxy 202 within the remote space, while also providing visual feedback to the operator 200 through a virtualized overlay of the detected position and correlation of the proxy controller suit 100 as the operator 200 moves within the proxy controller suit 100 to control the proxy 202. This system also allows the operator 200 to quickly determine if the movements of the proxy controller suit 100 are no longer accurately aligned and registered with the movements of the proxy 202.

Figure 6:
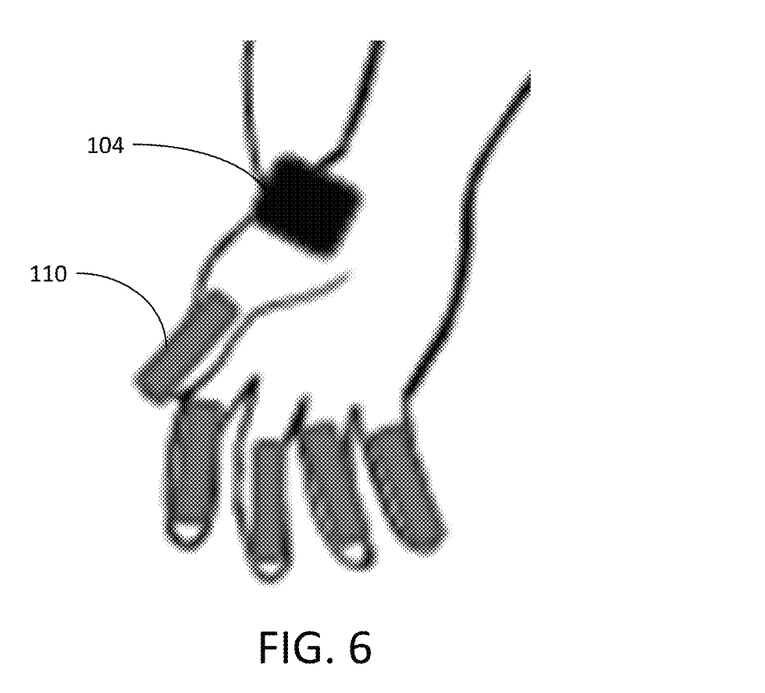
FIG. 6 provides a depiction of a hand grip peripheral controller of the proxy controller suit.

Turning to FIG. 6, shown therein is an example of the peripheral controller 110. In this embodiment, the peripheral controller 110 is configured as a glove to be worn by the operator 200 to detect and measure movement of the operator's fingers and thumb. In this embodiment, the peripheral controller 110 includes an integrated motion sensor 104 to monitor the position and movement of the operator's hand.

In other embodiments, the peripheral controller 110 is configured with buttons, joysticks or other input devices that are specifically designed for controlling aspects of the robot proxy 202 or implements or interfaces used by the robot proxy 202. The peripheral controller 110 can be connected through a wired or wireless connection to the central tracking unit 102 or mainboard 106.

Figure 7:
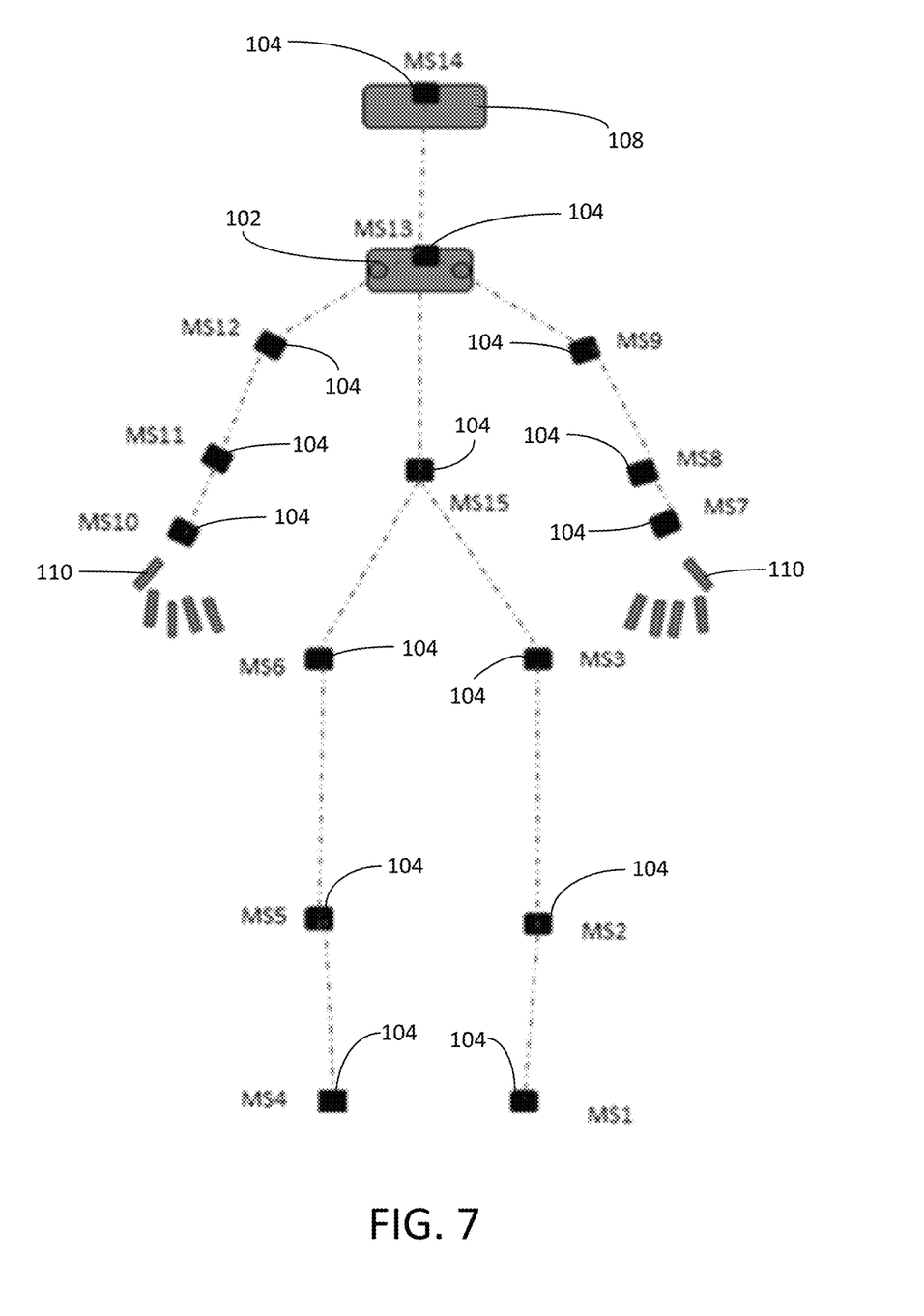
FIG. 7 depicts the networked arrangement of motion sensors, central tacking unit, visor and controllers of the proxy controller suit of FIG. 2.
Figure 8:
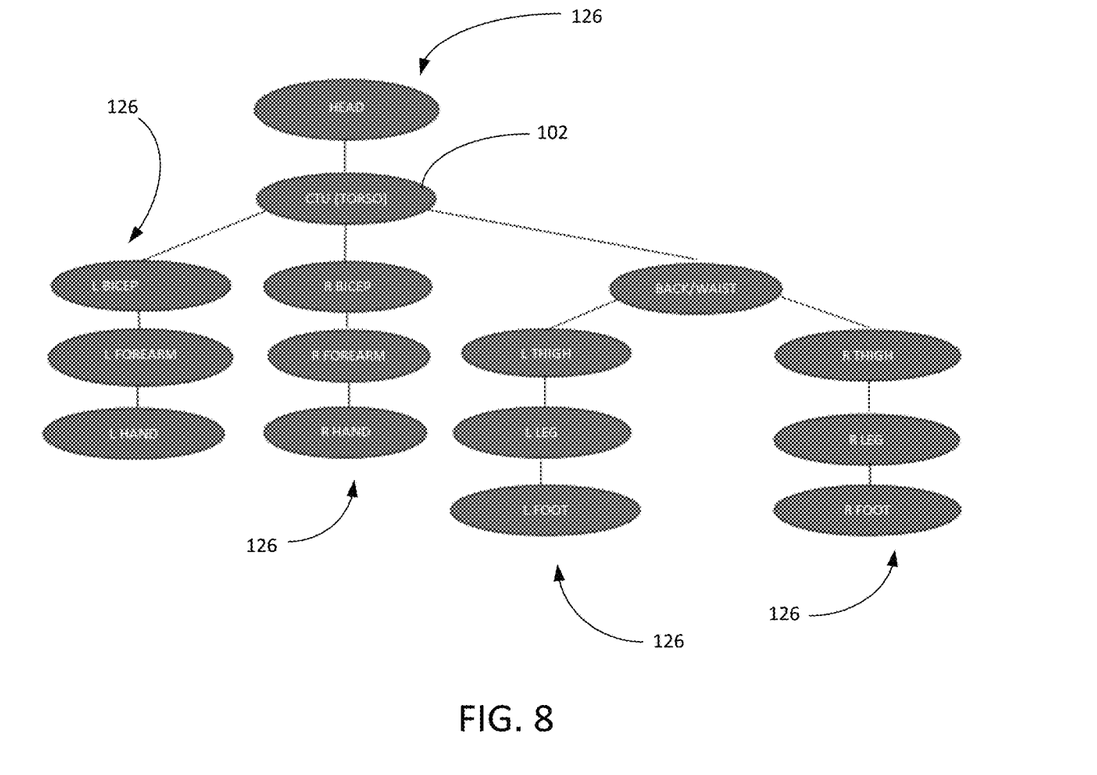
FIG. 8 shows the parent-child relationship between the networked motion sensors within the proxy controller suit of FIG. 2.

Turning to FIGS. 7 and 8, shown therein are hierarchal representations of the distributed motion sensors 104 within the proxy controller suit 100. The motion sensors 104 are arranged in an interlinked, skeletal network and functionally tethered to the central tracking unit 102, either directly or through the motion sensor mainboard 106. Within the proxy controller suit 100, the central tracking unit 102 acts as a reference point against which the motion signals generated by the motion sensors 104 are based. The central tracking unit 102 is essential for accurately tracking the gross position of the proxy controller suit 100 in the tracked local space 204, so that the accurate position of the discrete motion sensors 104 within the proxy controller suit 100 can be tracked without sensor drift errors. The central tracking unit 102 provides a more accurate tracking system for the motion sensors 104 by providing a common, centralized positional reference point.

In exemplary embodiments, the motion sensors 104 are configured to detect motion (acceleration and/or rotation). In some embodiments, the motion sensors 104 are inertial-measurement-units ("IMUs"), which measure changes in acceleration and orientation, which can then be extrapolated mathematically into velocities and movement. Suitable motion sensors are commercially available and include the Adafruit 9-DOF Absolute Orientation IMU Fusion Breakout BNO055, and custom sensors with similar properties containing the functionality of a gyroscope and accelerometer.

Although effective at detecting changes in acceleration and orientation, conventional IMU sensors are not configured to provide distinct position in a tracking space. Relying solely on the output of conventional IMU sensors for position information may lead to sensor drift errors that frustrate efforts to accurately track the position and movements of the proxy controller suit 100. The solution provided in many existing motion capture suits is to use Kalman Filtering, an algorithm which attempts to predict the target position of an item based on its known prior position and additional parameters influencing its state (such as its velocity or trajectory in 3D space). Testing has shown, however, that this approach may also result in substantial drift errors. These errors prevent adoption in applications in which the output of the discrete motion sensors is used to precisely control a proxy.

To address these sensor drift errors, the motion sensors 104 and other components of the control suit 100 are functionally tethered back to the central tracking unit 102. Because the central tracking unit 102 is tracked within the tracking space and has an absolute position, the accurate position of the central tracking unit 102 can be applied to the other motion sensors, thereby eliminating drift. This process eliminates drift without using Kalman filtering and provides more accuracy in controlling the proxy 202. Thus, by tethering the motion sensors 104 back to the central tracking unit 102, it is only necessary to accurately track the absolute position of the central tracking unit 102 to achieve accurate tracking of all of the motion sensors 104.

Generally, the motion sensors 104 are strategically placed at locations on the operator's body such that each motion sensor 104 tracks the movement of a different portion of the operator's skeleton and relates that movement back to the referential central tracking unit 102. For example, the motion sensor placed on the operator's right forearm (e.g., "MS11" in FIG. 7) measures acceleration and orientation of the right forearm. In isolation, it would be challenging to accurately identify the position of the operator's right forearm using only the output from the "MS11" motion sensor 104. However, when the output of the discrete motion sensor 104 is combined with the output of other motion sensors 104 within the skeletal cluster of sensors from the operator's right hand (MS10) up the right arm (MS11 and MS12) to the central tracking unit 102 (MS13), the movement and position of the forearm can be accurately tracked. If, for example, only the wrist sensor (MS10) and forearm sensor (MS11) report changes in acceleration or orientation and the other sensors in the "right arm sensor cluster" do not report movement, the suit controller 218 could interpret the motion as a twist or rotation about the operator's elbow. In this way, the control suit 100 leverages the fixed locational relationships created by the operator's skeleton as the basis for accurately interpreting the data generated by the motion sensors 104, which can be output as movement of a "virtual" skeleton.

In exemplary embodiments, the rotation and acceleration of each motion sensor 104 is measured and analyzed as part of a sensor cluster 126 that generally extends from the central tracking unit 102 on the operator's torso to the motion sensors 104 located on the operator's extremities. The central tracking unit 102 serves as a root node, with all other motion sensors 104 parented to it in the skeletal sensor clusters 126. The parent-child structure of the motions sensors 104 to central tracking unit 102 is shown in FIG. 8, with the central tracking unit 102 being the final parent in the parent-child structure for all segmented groups. The rotation of any motion sensor 104 relative to the initial calibration position can be determined by comparing the rotation of the child motion sensor to the rotation (or absence of rotation) of the parent motion sensor. The movements of the proxy 202 can be determined and set to match this relative rotation. This is accomplished by the same rotation being implemented at the analogous, corresponding points within the proxy 202.

As depicted in FIG. 7, the proxy controller suit 100 has fifteen (15) motion sensors 104 (labeled MS1 through MS15) and a single central tracking unit 102. As explained, the motion sensors 104 are divided into grouped sensor clusters 126 which are tethered back to the central tracking unit 102 through a data connection. Using these sensor clusters 126, a virtual skeletal structure can be approximated. The approximation is created by calibrating the proxy controller suit 100. During a calibration phase, the control suit 100 is worn by the operator 200 and the distances between the central tracking unit 102 and each distributed motion sensor 104 and the distances between each interlinked motion sensor 104 can be estimated or measured.

The motion sensors 104 may be affixed to the operator's body using straps, adhesives, magnets, or other attachment mechanisms. In some embodiments, the various motion sensors 104 are integrated into a suit or clothing worn by the operator. In some embodiments, the motion sensors 104 are placed at the following locations on the operator: upper arm/bicep (MS9 and MS12); forearm (MS8 and MS11); top of hand above wrist (MS7 and MS10); mid-thigh quadriceps (MS3 and MS6); shin/calf (MS1 and MS5); top of foot (MS2 and MS4); head (MS14); upper torso (MS13); and back/waist (MS15).

As shown in FIG. 8, the proxy controller suit 100 may be configured with five clusters 126 of motion sensors 104: the sensor cluster 126 having motion sensors 104 placed on a left bicep, forearm, and hand; the second sensor cluster 126 having motion sensors 104 on a right bicep, forearm, and hand; the third sensor cluster 126 having motion sensors 104 on a left foot, leg, thigh and on a point in the back; the fourth sensor cluster 126 having motion sensors 104 on the right foot, leg, thigh and on a point in the back; and the fifth sensor cluster 126 having a motion sensor 104 (or visor 108) placed on the head of the operator 200. As otherwise noted herein, it will be understood that other embodiments may include additional or fewer motion sensors 104 or segmented groups, or segmented groups tethered in different orientations and configurations.

During calibration, the distance between motion sensors 104 in a segmented group can be estimated or measured and then adjusted for accuracy. For example, during calibration in the first sensor cluster, the distance between the MS10 motion sensor (right hand) to MS11 (right forearm) is measured. Next the distance from MS11 (right forearm) to MS12 (right bicep) is measured. Finally, the distance from MS12 (right bicep) to MS13 (central tracking unit 102/torso) is measured. In this way, each motion sensor 104 on the right arm sensor cluster 126 is linked back to the central tracking unit 102 so that each part of the right arm is tracked within the tracking space with reference to the central tracking unit 102. The same process can be repeated for the left arm sensor cluster 126 (MS7 through MS9), the left leg sensor cluster 126 (MS1 through MS3), and the right leg sensor cluster 126 (MS4 through MS6). In some embodiments, the left and right leg clusters 126 are tethered to the waist motion sensor (MS15), which is then tethered back to the central tracking unit 102, thereby creating an additional torso sensor cluster 126 (MS15 and MS13). These segmented groups create the virtual skeletal structure which is a reference for the movements of the proxy 202.

In addition to leveraging the operator's skeletal structure for the purpose of accurately detecting movement of the various parts of the operator's body, it is also important to establish an accurate scale between the proxy 202 and the virtual skeleton produced by the control suit 100. If the operator 200 and proxy 202 are exactly the same size, each movement by the operator 202 could be reproduced at the proxy 202 on a 1:1 basis. If the operator 200 raises his arm 12 inches to grasp a lever, the proxy 202 would raise its arm by the same distance. On the other hand, if the operator 200 and proxy 202 are not the same size or proportion, it is important to properly scale the movements detected by the control suit 100 so that the dissimilar proxy 202 responds appropriately. While the joint angle in the proxy 202 may align with that of the operator 200, the absolute limb position of the proxy 202 will not match the corresponding limb of the operator 200 unless the length of the proxy's limbs are proportionally scaled to match the operator's. Thus, during the calibration routine, the size of each segment of the virtual skeleton produced by the control suit 100 can be scaled to match the corresponding dimensions of the proxy 202. The calibration process allows the proxy controller suit 100 to be used by operators 200 of different sizes with the same increased accuracy.

Figure 9:
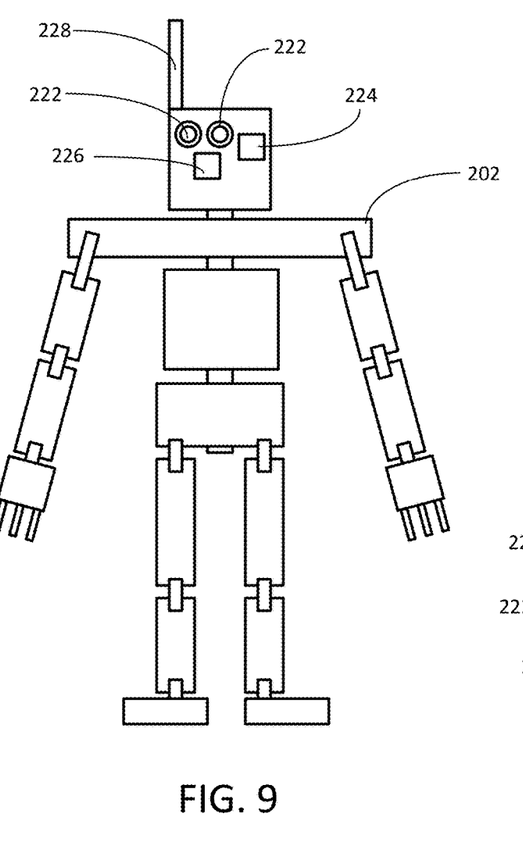
FIG. 9 provides a depiction of a bipedal robot proxy.
Figure 10:
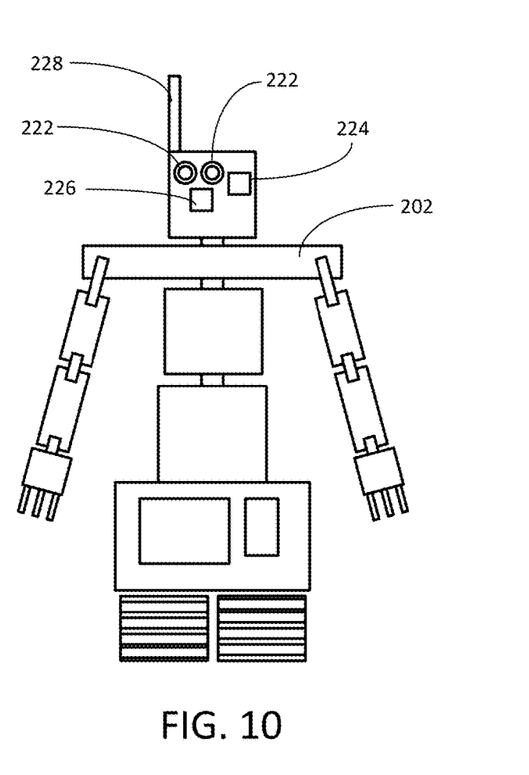
FIG. 10 provides a depiction of a wheeled track robot proxy.

Turning to FIGS. 9 and 10, shown therein are sample depictions of the proxy 202. The proxy 202 is generally humanoid, with arms, hands, a torso and a head. The proxy 202 may include legs (as depicted in FIG. 9) or a wheeled or tracked mobility system (as depicted in FIG. 10). The proxy 202 may also include one or more proxy microphones 224 for detecting sounds from the remote space 206 and a proxy speaker 226 configured to output sounds from the proxy 202. In some embodiments, the proxy microphones 224 are configured to record multi-channel sounds, which are passed to the proxy controller suit 100 in a manner that permits the operator 200 to perceive sounds in a directional format as recorded by the proxy 202. For example, a sound emanating from a source to the front and left of the proxy 202 would be played for the operator 200 through the proxy controller suit 100 in a manner which indicates the direction of the sound. Visual directional indicators within the view provided by the visor 108 can also be used by the operator 200 to identify the direction of the sound. The proxy 202 includes a communications module 228 that is configured to exchange data between the proxy 202 and the proxy controller 220.

In exemplary embodiments, the proxy 202 includes one or more proxy cameras 222 that provide a visual depiction of the field surrounding the proxy 202. In some embodiments, the visual representations presented by the proxy cameras 222 is standard two-dimensional video that is displayed to the operator 200 in a two-dimensional flat or curved representation within the visor 108. Although the two-dimensional representation may be appropriate or adequate in some applications, the lack of depth perception available to the operator 200 may frustrate efforts to accurately control the proxy 202 in the remote three-dimensional space.

In other embodiments, the proxy cameras 222 are configured to provide a three-dimensional representation of the remote space 206 surrounding the proxy 202. The proxy cameras 222 can be configured to render a full three-dimensional virtual reality representation of the area surrounding the proxy 202, which can be displayed in a three-dimensional format within the visor 108 of the proxy controller suit 100. Building an accurate three-dimensional model of the space surrounding the proxy 202 and faithfully passing this model back to the proxy controller suit 100 permits a much more accurate representation of the position, size and scale of objects surrounding the robot proxy 202 while addressing the depth perception problems associated with two-dimensional visual fields.

In embodiments in which visual data is passed back to the proxy controller suit 100 in a three-dimensional format, the proxy cameras 222 are configured to collect data using depth cameras that provide distance information for each pixel in a captured frame in addition to standard RGB color data. The proxy controller 220 and suit controller 218 can be configured to process the three-dimensional image data and construct a point cloud using this data. Every pixel within the image is rendered in three dimensional space as a polygon or shape relative to the orientation of the proxy cameras 222 at the corresponding distance away. The resulting three dimensional model provides a real-time representation of objects surrounding the proxy 202, with appropriate depth and scale based on the distance between those objects and the proxy 202. The objects can be illustrated with using textures and colors obtained from the proxy cameras 222, or through use of custom shaders that use automated image processing algorithms to apply textures to the three-dimensional representations of objects.

In other embodiments, particularly where bandwidth between the proxy 202 and the proxy controller suit 100 is limited, the three dimensional representations can be passed to the visor 108 as simplified, untextured wireframe meshes. This reduces the overall video processing demands of rendering the information and alleviates constraints on communication bandwidth requirements. The wire mesh representations presented to the operator 200 through the proxy controller suit 100 provide accurate distance, location, scale and proportions for three dimensional depictions of the objects surrounding the proxy 202, even if the objects are not displayed to the operator 200 with fully rendered images. Thus, this solution has the effect of bringing the real world surrounding the proxy 202 into "virtual reality" for the operator 200 of the proxy controller suit 100. Providing the operator 200 with an accurate sense of depth by viewing the remote space 206 environment in three dimensional virtual reality makes it much easier for the operator 200 to accurately manipulate objects in the remote space 206 with the proxy 202, while also providing improved obstacle avoidance for navigating the proxy 202 through the remote space 206.

In a first method of deploying the three dimensional visual representation of the remote space 206, the proxy cameras 288 are configured to capture objects within the field of view of the proxy 202. In this method, the three dimensional representation of the remote space is constructed in real time by recording the immediate field of view from the proxy 202, with no effort to capture images outside or beyond the present field of view from the proxy 202.

In a second method of constructing the three dimensional visual representation of the remote space 206, the proxy cameras 288 are configured to construct are more complete three dimensional representation of the remote space 206 surrounding the proxy 202 (including objects outside the immediate field of view of the proxy 202). The full three dimensional representation of the remote space 206 can be constructed by capturing three dimensional images can be stored and indexed by location within the remote space 206. When the proxy 202 returns to the same location within the remote space 206, the stored images can be retrieved for display to the operator 200 or for comparison and refinement based on new images obtained by the proxy 202. This method works well for applications in which the proxy 202 includes a single forward-facing depth camera 288. When the gaze of the proxy 202 returns to an object that has been previously scanned and integrated into the three dimensional model of the remote space 206, the operator 200 is shown the portion of the existing three dimensional model that correlates to the proxy's current field of view.

In another embodiment, a full three dimensional representation of the remote space 206 surrounding the proxy 202 is generated through the use of an array of strategically placed proxy cameras 288 with depth functionality that scan the entire location surrounding the proxy 202, regardless of the immediate orientation or direction of the proxy 202. This permits the operator 200 to perceive a fully immersive virtual representation of the remote space 206 in real-time, including of objects that might be moving or changing outside the forward-facing view of the proxy 202.

When the proxy control suit 100 is used in connection with a full three-dimensional representation of the remote space 206, the operator 200 controls the proxy 202 in the same manner the operator 200 would use the proxy controller suit 100 to control a virtual proxy within a fully virtual environment such as a video game. Thus, although the proxy controller suit 100 is well suited for controlling a remote robot proxy 202, the proxy controller suit 100 is equally well suited for controlling a virtual proxy within a video game or other fully virtual environment, which is contemplated as falling within the scope of exemplary embodiments.

As generally depicted in FIG. 1, the proxy controller suit 100 communicates through data networks with the proxy 202 through the suit controller 218 and the proxy controller 220, which are each configured to receive, process and send data between proxy controller suit 100 and the proxy 202. The suit controller 218 collects information, such as motion information from the motion sensor mainboard 106, as well as any other information which may be useful in tracking the position and movements of the proxy controller suit 100. The suit controller 218 may also receive information from the proxy controller 220, sensors, or other suitable inputs. The suit controller 218 can send data to components of the proxy controller suit 100 such as the visor 108 or any other suitable components of the proxy controller suit 100.

As described above, the suit controller 218 implements suit controller software to calculate the absolute position of each body segment using central tracking unit 102 position and all motion sensor data. The suit controller 218 can be an external general-purpose computing device such as a PC, tablet, smartphone, or any other sufficient computing device. The suit controller 218 may also be mounted on the proxy controller suit 100 as a component attached to the user as a microcontroller, system on chip, micro pc or other small computing form factors. The suit controller 218 also performs functions such as calculating information, interpreting, converting, cleaning, normalizing and compressing suit data so that it can be sent in an optimal format to the proxy controller 220, where it will be utilized by the proxy controller software to run commands that actuate motors, sensors and/or devices to control the movements and actions of the proxy 202.

The proxy controller 220 receives motion commands from the suit controller 218. The proxy controller 220 processes the commands which are then sent to the proxy 202 as movement or other action commands. Movement commands from the proxy controller 220 to the proxy 202 may include commands to actuate motors and other devices on the proxy 202. The proxy controller 220 may also send environmental data (e.g., temperature, gas composition, etc.) and audio and visual data from the proxy 202 back to the suit controller 218. It will be understood, by those of ordinary skill in the art, and by the other embodiments and explanations described below, that the proxy controller suit 100 may also have additional components, such as controllers, additional sensors, displays, connection components, and user feedback devices.

The suit controller 218 is also used to perform other functions such as sending and receiving data from components of the suit 100. Received data may include flex sensor data sent from peripheral controllers 110, audio data sent by the microphone 122 in the visor 108, or any other data which may be sent of a wired or wireless connection. Sent data may include feedback data, based on visual or audio data sensed by the proxy 202 and sent to the suit 100 such as visual, auditory, haptic motor, or environmental data. The suit controller 218 may also be used to change suit calibration settings or other proxy controller suit 100 settings by a providing a visual interface allowing user to calibrate the proxy controller suit 100 based on the operator's size and stature, visor display brightness, volume, power settings, haptic feedback sensitivity, TCP/IP network configuration or any other proxy controller suit setting.

The suit controller 218 may also be used to send movement information to the proxy that is not based on the motion sensors 104 or the central tracking unit 102. For instance the suit controller 218 may be used to send a disconnect signal to the proxy so that the movements of the motion sensors 104 will no longer move the proxy 202, and subsequent or reconnect signals to begin tracked movement based on the motion sensors 104 and central tracking unit 102 again. A position reset signal may also be sent the proxy, which may tell the proxy to assume a preprogrammed position, such as the T-position, for calibration. Other preset movements may also be set as commands which may be sent via the suit controller such as jump, run, walk, sit, speak, or any other movement or operation command. These commands may be based on inputs given directly to the suit controller 218, other instructions given by the user, such as gestures or auditory signals given through the visor, or any other sufficient means of inputting data and instruction into the suit controller 218.

The proxy controller 220 is the physical hardware device that runs the proxy control software. The proxy controller 220 is connected to various parts of the proxy 202 which may include a machine or robot that it is responsible for controlling, parts such as local motors, servos, speakers, and sensors. The proxy controller 220 maintains connectivity to all these components and takes action to enable, actuate or utilize them when it receives commands from the proxy control software. Many of the commands that that the proxy controller 220 performs will have come from the suit controller 218 software because of motion or actions that are being performed by the operator 200 of the proxy controller suit 100. The proxy controller 220 is also used to transfer data back to the suit controller 218 to provide feedback to the operator 200 of the proxy controller suit 100.

The proxy controller 220 may also be used to perform additional functions such as sending and receiving data to and from the proxy 202 and proxy controller suit 100 input and output devices. This data may include audio and visual data from input and output devices on the proxy 202 or proxy controller suit 100, such as screens, microphones, speakers, haptic feedback devices, or any other devices which are capable of providing input and output. This data may be sent or received by the various peripherals such as cameras, microphones or any other input devices which are connected to the proxy controller 220 and proxy 202. The proxy controller 220 may also be used to modify calibration settings, perform scheduled events, or modify other proxy settings. The proxy controller 218 may also be used send environmental data, or any other data regarding the remote space 206. It will be understood that the proxy controller 220 may be able to send and receive other types of data and instructions, which the proxy 202 may receive or sense.

During use, the motion sensors 104 are connected to the motion sensor mainboard 106, which collects and analyzes information from the motion sensors 104. The motion sensor data is sent by the motion sensor mainboard 106 to the suit controller 218 for analysis by the suit controller software. The tracked position of the central tracking unit 102 is sensed by the central tracking unit 102 (or by an external sensor) and the tracked position data is sent to the suit controller 218. Using the central tracking unit 102 tracked position data and the motion sensor 104 movement data, the suit controller 218 determines the absolute positions for all tracked segments of the operator's body. This data is then sent by the suit controller 218 to the proxy controller 220, which processes and translates the movement data from the control suit 100 into directed movements and commands for the proxy 202.

Before the proxy 202 can be controlled using the control suit 100, the control suit 100 and proxy 202 should be placed in a common position to register the position of the control suit 100 with the state and orientation of the proxy 202. For example, it may be desirable following the scaling process to place the proxy 202 in an initial or default position and then instructing the operator to match the default position with the control suit 100. In some embodiments, a humanoid proxy 202 is placed in a "T-pose" in which the arms of the proxy 202 are extended outward laterally from the torso at a substantially horizontal position. The operator can then match the "T-pose" while wearing the control suit 100 to register the position and orientation of control suit 100 to the proxy 202. It will be appreciated that the process used to initially register the proxy 202 and control suit 100 will depend on the anatomical design of the proxy 202 and the types and configuration of sensors within the control suit 100.

Figure 11:
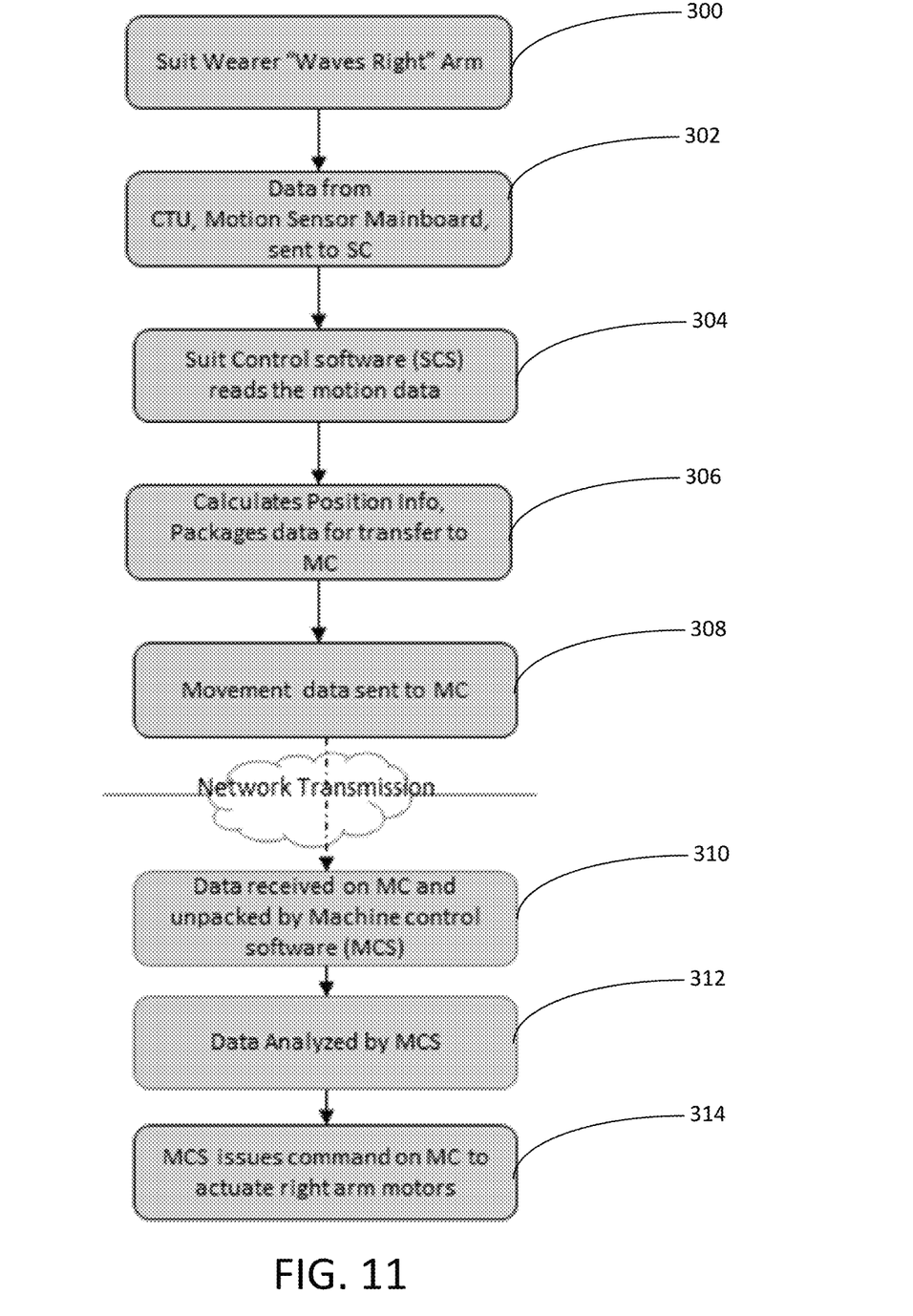
FIG. 11 provides an exemplar method of controlling the movement of a robot proxy with the proxy controller suit.

Turning to FIG. 11, shown therein is an exemplar process for using the proxy controller suit 100 to control a proxy 202. Specifically, FIG. 11 describes the process for using a properly calibrated control suit 100 to command the humanoid proxy 202 to raise its right arm. For reference, the arm is raised from the T-pose position which may be used for calibration and registration as described above. When the operator "waves right arm" at step 300, the motion sensors 104 on the right hand (MS10) and right forearm (MS11) will sense the acceleration and rotation of the hand and forearm. These measurements will be compared to the lack of movement measured by the shoulder sensor (MS12) and torso (MS13—central tracking unit 102).

At step 302, the motion data is sent to the motion sensor mainboard 106 and to the suit controller 218. At step 304, the motion data of each motion sensor 104 is then used to calculate a relative rotation by the suit controller software. The relative rotation is the rotation of the child motion sensors compared against the rotation (or lack of rotation) of the parent motion sensor for each motion sensor 104 in the sensor cluster for the right arm. In this example, the first child motion sensor would be the hand (MS10) and the first parent would be the forearm (MS11). The second child would be the forearm (MS11) and the second parent would be the shoulder (MS12) and so on for each segmented group of motion sensors until the central tracking unit 102 is the parent. In step 306, the relative position data is packaged for transfer to the proxy controller 108. In step 308, the relative position data is then sent to the proxy controller 220, via a wired or wireless connection. In step 310, the data is received by the proxy controller 220 and unpacked for processing. Then in step 312, the position data is analyzed by the proxy controller software and the relative rotations are determined at the same relative points on the proxy 202 as the points the motion sensors 104 are placed at on the user. Then in the final step 314, the proxy movements are initiated and the proxy 202 will move in the manner desired by the user based on their movements.

Figure 12:
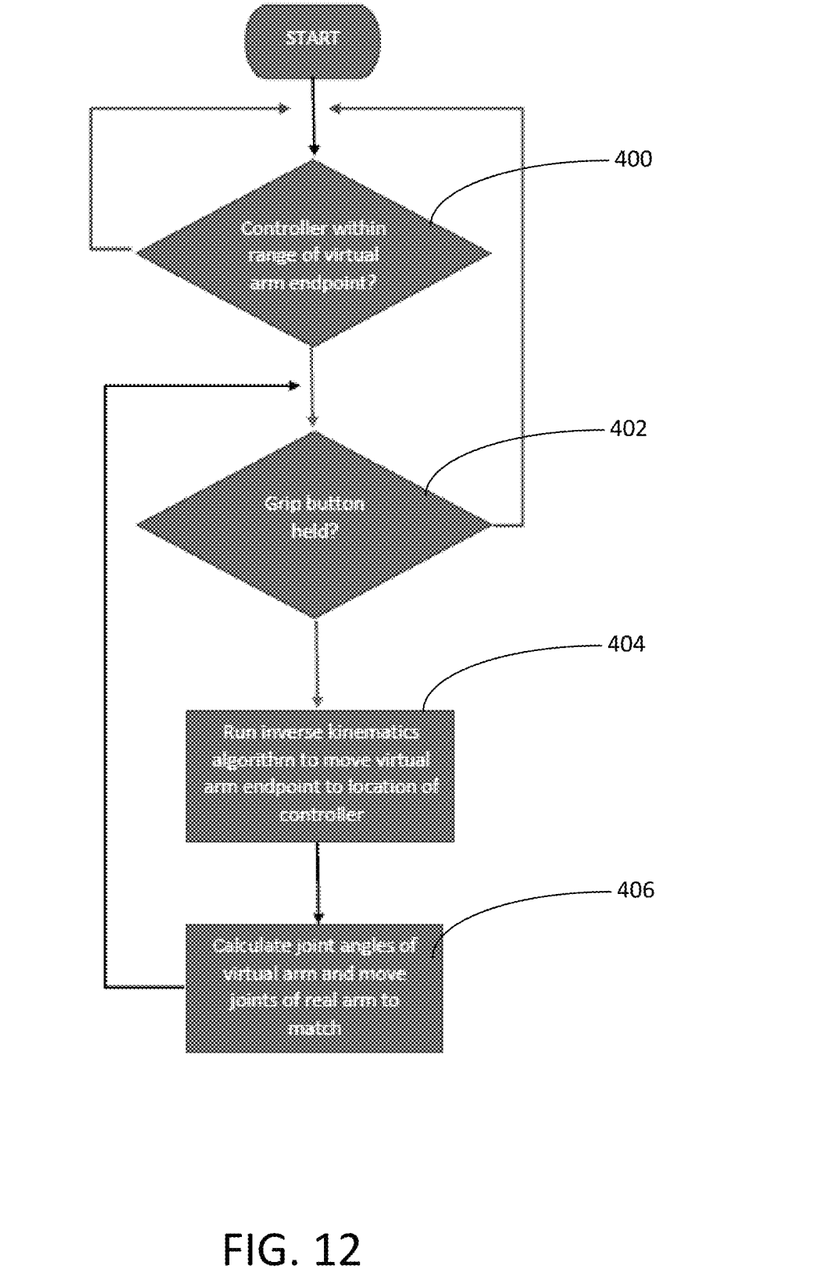
FIG. 12 provides an exemplar method of switching to an inverse kinematic control scheme for close-range control of the robot proxy with a target object.

Turning to FIG. 12, shown therein is a method for switching from a conventional kinematics model to an inverse kinematics model for controlling the proxy 202. In the conventional kinematics model discussed above, the proxy 202 is instructed to follow the movements of the operator 200, with or without scaling to adjust the magnitude of these movements. Although well suited for the detection, interpretation, translation and application of larger, gross movements, the conventional forward kinematics model may be undesirable for particular movements that require the precise positioning of the proxy's terminal linkages (e.g., the hand grip of the proxy 202). In these situations, it may be desirable to switch to an inverse kinematics model in which the movement of the proxy 202 is determined based first on the desired placement of the end linkage (e.g., proxy grip) at a target location before determining the movements of the intervening linkages required to place the terminal linkage in the target position. As explained below, the suit controller 218 and proxy controller 220 can be programmed to automatically or manually switch to an inverse kinematics model to increase the accuracy of the placement of a part of the proxy 202 at the target location.

Beginning at step 400, the suit controller 218 determines whether the peripheral controller 110 of the proxy controller suit 100 is within a threshold distance of the target object selected by the operator 200 within the representation of the proxy 202 within the remote space 206 displayed in the visor 108. In this way, the operator 200 can use the peripheral controller 110 to select through the visual representation displayed in the visor 108 a particular target object within the remote space (e.g., a lever) and the proxy controller 220 then determines the distance between the target object and the hand of the proxy 202. If the distance between the proxy 202 and the target object is less than the threshold distance (e.g., within 5 meters, 1 meter, 0.5 meters, 0.25 meters, 0.1 meters), the proxy controller 220 and suit controller 218 can be configured to automatically place the suit controller in an inverse kinematics mode. In other embodiments, as depicted in FIG. 12, the process continues as step 402 when the suit controller 218 is manually placed into the inverse kinematics mode if a grip button or other input feature on the peripheral controller 110 is selected.

Once the inverse kinematics mode is selected, the operator 200 moves or maintains the virtual representation of the peripheral controller 110 on the visual representation of the target object within the display of the visor 108. At step 404, the proxy controller 220 then moves the hand of the proxy 202 so that the virtual representation of the hand of the proxy 202 matches the virtual position of the peripheral controller 110 on the target object. The proxy controller 220 and/or the suit controller 218 then calculates a proxy movement solution to actually move the hand of the proxy 202 to the target object in the remote space 206 at step 406. The proxy movement solution can be calculated to avoid contact with other objects, interferences or restrictions within the remote space 206. In this way, the movement of the proxy 202 (or the proxy's hand or other terminal linkage) is determined by matching the desired end location of the proxy's terminal linkage with the placement of the peripheral controller 110, before backing into a movement solution for the intermediate linkages within the proxy 202. In this way, the proxy controller suit 100, suit controller 218, proxy controller 220 and proxy 202 cooperate to provide a manually or automatically activated inverse kinematics movement model that is particularly well suited for making fine motor movements of the proxy 202 where the placement and position of the end linkage of the proxy 202 is prioritized over the replication of gross motor movements between the operator 200 and the proxy 202.

It is to be understood that the terms "including", "comprising", "consisting" and grammatical variants thereof do not preclude the addition of one or more components, features, steps, or integers or groups thereof and that the terms are to be construed as specifying components, features, steps or integers. As used herein, the term "proxy control system" refers to the collection of the proxy controller suit 100, suit controller 218, proxy controller 220 and proxy 202.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept.

It is claimed:

1. A proxy controller suit for enabling an operator to control an actual or virtual proxy in an actual or virtual remote space, the proxy controller suit comprising:
   a central tracking unit, wherein the central tracking unit is configured to provide the position of the operator in a tracked space;
   a first motion sensor attached to a first location on a first appendage of the operator at a known first distance from the central tracking unit, wherein the movement of the first motion sensor is determined with reference to the central tracking unit; and
   a second motion sensor attached to a second location on the first appendage of the operator at a known distance from the first motion sensor, wherein the movement of the second motion sensor is determined as a function of the measurements made by the first motion sensor.

2. The proxy controller suit of claim 1, wherein the first motion sensor and the second motion sensor are each attached to the first appendage at locations that correspond to different sides of a joint within the operator's skeletal structure.

3. The proxy controller suit of claim 1, further comprising a visor that provides the operator with a visual representation of the remote space.

4. The proxy controller suit of claim 3, wherein the visor is a virtual reality headset that provides the operator with a three dimensional rendering of the remote space.

5. The proxy controller suit of claim 3, wherein the central tracking unit comprises:
   one or more wide angle cameras;
   one or more stereo capture lenses; and
   an infrared projector.

6. The proxy controller suit of claim 3, further comprising one or more peripheral controllers.

7. The proxy controller suit of claim 6, wherein the one or more peripheral controllers are gloves configured to be worn by the operator.

8. The proxy controller suit of claim 1, wherein the first motion sensor is an inertial measurement unit that is configured to measure changes in acceleration and orientation.

9. The proxy controller suit of claim 1, wherein the central tracking unit is configured to track the location of the operator within the tracked space without an external camera system.

10. The proxy controller suit of claim 1, wherein the central tracking unit is configured to track the location of the operator within the tracked space with external camera system.

11. A proxy controller suit for enabling an operator to control an actual or virtual proxy within an actual or virtual remote space, the proxy controller suit comprising:
- a central tracking unit located on the operator's torso, wherein the central tracking unit is configured to provide the position of the operator in a tracked space;
- a plurality of sensor clusters, wherein each of the plurality of sensor clusters corresponds to an appendage or portion of the operator's body, and wherein each of the sensor clusters comprises a plurality of motion sensors; and
- wherein the movement of each of the plurality of motion sensors is determined as a function of the measurements of movement made by other motion sensors in the applicable sensor cluster and with reference to the position of the central tracking unit.

12. The proxy controller suit of claim 11, wherein each of the plurality of motion sensors is arranged within the sensor clusters such that the plurality of motion sensors form a virtual skeleton that approximates the operator's actual skeleton.

13. The proxy controller suit of claim 12, wherein the distances between each of the plurality of motion sensors within the corresponding sensor cluster is determined during a calibration routine.

14. The proxy controller suit of claim 13, wherein the size and proportions of segments within the virtual skeleton are scalable to match the size and proportions of the corresponding portions of the proxy.

15. A proxy controller suit for enabling an operator to control a robot proxy in a remote space, the proxy controller suit comprising:
- a central tracking unit located on the operator's torso, wherein the central tracking unit is configured to provide the position of the operator in a tracked space;
- a plurality of sensor clusters, wherein each of the plurality of sensor clusters corresponds to an appendage or portion of the operator's body, and wherein each of the sensor clusters comprises a plurality of motion sensors;
- a suit controller that translates output from the plurality of sensors into command signals delivered to the proxy, wherein the suit controller is configured to shift between a conventional kinematic model and an inverse kinematic model; and
- a proxy controller that is configured to accept the command signals from the suit controller and apply those command signals to the proxy.

16. The proxy controller suit of claim 15, wherein the operator can manually shift the control of the proxy from a conventional kinematic model to an inverse kinematic model.

17. The proxy controller suit of claim 15, wherein the suit controller automatically shifts from the conventional kinematic model to the inverse kinematic model when the operator extends an appendage to interact with a target object in a manner that requires the proxy to exercise accurate control of the corresponding proxy appendage.

18. The proxy controller suit of claim 15, wherein the proxy controller is configured to place the corresponding proxy appendage on the target object and then determine a solution for the required movements involving any intervening linkages in the proxy while applying the inverse kinematic model.

19. The proxy controller suit of claim 15, wherein the robot proxy comprises one or more proxy cameras that are configured to visually scan the remote space to construct a three dimensional virtual representation of the remote space.

20. The proxy controller suit of claim 19, further comprising a visor that is configured to display the three dimensional virtual representation of the remote space to the operator.

* * * * *